(12) United States Patent
Ryal

(10) Patent No.: US 7,286,667 B1
(45) Date of Patent: Oct. 23, 2007

(54) DECRYPTION SYSTEM

(75) Inventor: Kim Annon Ryal, Poway, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 588 days.

(21) Appl. No.: 10/662,585

(22) Filed: Sep. 15, 2003

(51) Int. Cl.
*H04N 7/167* (2006.01)

(52) U.S. Cl. .................. 380/200; 380/201; 380/210; 725/31

(58) Field of Classification Search ............... 380/200, 380/201, 210, 236, 42, 37, 208; 726/26–33; 725/31, 87, 25; 709/229, 201, 203; 705/50, 705/51, 57
See application file for complete search history.

(56) References Cited

U.S. PATENT DOCUMENTS

| | | |
|---|---|---|
| 3,852,519 A | 12/1974 | Court |
| 4,381,519 A | 4/1983 | Wilkinson et al. |
| 4,419,693 A | 12/1983 | Wilkinson |
| 4,521,853 A | 6/1985 | Guttag |
| 4,634,808 A | 1/1987 | Moerder |
| 4,700,387 A | 10/1987 | Hirata |
| 4,703,351 A | 10/1987 | Kondo |
| 4,703,352 A | 10/1987 | Kondo |
| 4,710,811 A | 12/1987 | Kondo |
| 4,712,238 A | 12/1987 | Gilhousen et al. |
| 4,722,003 A | 1/1988 | Kondo |
| 4,739,510 A | 4/1988 | Jeffers et al. |
| 4,772,947 A | 9/1988 | Kondo |
| 4,785,361 A | 11/1988 | Brotby |
| 4,788,589 A | 11/1988 | Kondo |
| 4,815,078 A | 3/1989 | Shimura |
| 4,845,560 A | 7/1989 | Kondo et al. |
| 4,887,296 A | 12/1989 | Horne |
| 4,890,161 A | 12/1989 | Kondo |
| 4,914,515 A | 4/1990 | Van Luyt |
| 4,924,310 A | 5/1990 | von Brandt |
| 4,944,006 A | 7/1990 | Citta et al. |

(Continued)

FOREIGN PATENT DOCUMENTS

EP  0471373  2/1992

(Continued)

OTHER PUBLICATIONS

Liu, et al. Motion Vector Encryption in Multimedia Streaming, 2004, IEEE, pp. 64-71.

Alattar, A.M. et al., Improved selective encryption techniques for secure transmission of MPEG video bitstreams, Oct. 24, 1999, Digimarc Corp., Lake Oswego, OR, USA, IEEE, pp. 256-260.

Kunkelmann T. et al., A scalable security architecture for multimedia communication standards, Darmstard Univ. of Technology, ITO, Germany, 1997, pp. 660-661.

(Continued)

*Primary Examiner*—Kim Vu
*Assistant Examiner*—Nirav Patel
(74) *Attorney, Agent, or Firm*—Miller Patent Services; Jerry A. Miller

(57) ABSTRACT

An apparatus for manipulating a selectively encrypted data stream in a manner consistent with certain embodiments has a filter that selects a set of packets from the selectively encrypted data stream based upon packet identifier values to produce a stream of packets having clear packets and encrypted packets. A packet substituter inserts a clear version of the encrypted packets into the stream of packets in place of the encrypted packets to produce a stream of clear data. This abstract is not to be considered limiting, since other embodiments may deviate from the features described in this abstract without departing from the invention.

17 Claims, 6 Drawing Sheets

U.S. PATENT DOCUMENTS

| | | |
|---|---|---|
| 4,953,023 A | 8/1990 | Kondo |
| 4,989,245 A | 1/1991 | Bennett |
| 4,995,080 A | 2/1991 | Bestler et al. |
| 5,018,197 A | 5/1991 | Jones et al. |
| 5,023,710 A | 6/1991 | Kondo et al. |
| 5,091,936 A | 2/1992 | Katznelson |
| 5,122,873 A | 6/1992 | Golin |
| 5,138,659 A | 8/1992 | Kelkar et al. |
| 5,142,537 A | 8/1992 | Kutner et al. |
| 5,144,662 A | 9/1992 | Welmer |
| 5,144,664 A | 9/1992 | Esserman et al. |
| 5,159,452 A | 10/1992 | Kinoshita et al. |
| 5,196,931 A | 3/1993 | Kondo |
| 5,208,816 A | 5/1993 | Seshardi et al. |
| 5,237,424 A | 8/1993 | Nishino et al. |
| 5,237,610 A | 8/1993 | Gammie et al. |
| 5,241,381 A | 8/1993 | Kondo |
| 5,247,575 A | 9/1993 | Sprague et al. |
| 5,258,835 A | 11/1993 | Kato |
| 5,319,707 A | 6/1994 | Wasilewski et al. |
| 5,319,712 A | 6/1994 | Finkelstein et al. |
| 5,325,432 A | 6/1994 | Gardeck et al. |
| 5,327,502 A | 7/1994 | Katata |
| 5,341,425 A | 8/1994 | Wasilewski et al. |
| 5,359,694 A | 10/1994 | Concordel |
| 5,379,072 A | 1/1995 | Kondo |
| 5,381,481 A | 1/1995 | Gammie et al. |
| 5,398,078 A | 3/1995 | Masuda et al. |
| 5,400,401 A | 3/1995 | Wasilewski et al. |
| 5,416,651 A | 5/1995 | Uetake et al. |
| 5,416,847 A | 5/1995 | Boze |
| 5,420,866 A | 5/1995 | Wasilewski |
| 5,428,403 A | 6/1995 | Andrew et al. |
| 5,434,716 A | 7/1995 | Sugiyama et al. |
| 5,438,369 A | 8/1995 | Citta et al. |
| 5,444,491 A | 8/1995 | Lim |
| 5,444,782 A | 8/1995 | Adams, Jr. et al. |
| 5,455,862 A | 10/1995 | Hoskinson |
| 5,469,216 A | 11/1995 | Takahashi et al. |
| 5,471,501 A | 11/1995 | Parr et al. |
| 5,473,692 A | 12/1995 | Davis |
| 5,481,554 A | 1/1996 | Kondo |
| 5,481,627 A | 1/1996 | Kim |
| 5,485,577 A | 1/1996 | Eyer et al. |
| 5,491,748 A | 2/1996 | Auld, Jr. et al. |
| 5,528,608 A | 6/1996 | Shimizume |
| 5,535,276 A | 7/1996 | Ganesan |
| 5,539,823 A | 7/1996 | Martin et al. |
| 5,539,828 A | 7/1996 | Davis |
| 5,553,141 A | 9/1996 | Lowry et al. |
| 5,555,305 A | 9/1996 | Robinson et al. |
| 5,561,713 A | 10/1996 | Suh |
| 5,568,552 A | 10/1996 | Davis |
| 5,574,787 A | 11/1996 | Ryan |
| 5,582,470 A | 12/1996 | Yu |
| 5,583,576 A | 12/1996 | Perlman et al. |
| 5,583,863 A | 12/1996 | Darr, Jr. et al. |
| 5,590,202 A | 12/1996 | Bestler et al. |
| 5,598,214 A | 1/1997 | Kondo et al. |
| 5,600,721 A | 2/1997 | Kitazato |
| 5,606,359 A | 2/1997 | Youden et al. |
| 5,608,448 A | 3/1997 | Smoral et al. |
| 5,615,265 A | 3/1997 | Coutrot |
| 5,617,333 A | 4/1997 | Oyamada et al. |
| 5,625,715 A | 4/1997 | Trew et al. |
| 5,629,981 A | 5/1997 | Nerlikar |
| 5,652,795 A | 7/1997 | Eillon et al. |
| 5,663,764 A | 9/1997 | Kondo et al. |
| 5,666,293 A | 9/1997 | Metz et al. |
| 5,699,429 A | 12/1997 | Tamer et al. |
| 5,703,889 A | 12/1997 | Shimoda et al. |
| 5,717,814 A | 2/1998 | Abecassis |
| 5,726,711 A | 3/1998 | Boyce |
| 5,732,346 A | 3/1998 | Lazaridis et al. |
| 5,742,680 A | 4/1998 | Wilson |
| 5,742,681 A | 4/1998 | Giachettie et al. |
| 5,751,280 A | 5/1998 | Abbott et al. |
| 5,751,743 A | 5/1998 | Takizawa |
| 5,751,813 A | 5/1998 | Dorenbos |
| 5,754,650 A | 5/1998 | Katznelson |
| 5,754,658 A | 5/1998 | Aucsmith |
| 5,757,417 A | 5/1998 | Aras et al. |
| 5,757,909 A | 5/1998 | Park |
| 5,768,539 A | 6/1998 | Metz et al. |
| 5,796,786 A | 8/1998 | Lee |
| 5,796,829 A | 8/1998 | Newby et al. |
| 5,796,840 A | 8/1998 | Davis |
| 5,802,176 A | 9/1998 | Audebert |
| 5,805,700 A * | 9/1998 | Nardone et al. ............ 380/217 |
| 5,805,712 A | 9/1998 | Davis |
| 5,805,762 A | 9/1998 | Boyce et al. |
| 5,809,147 A | 9/1998 | De Lange et al. |
| 5,815,146 A | 9/1998 | Youden et al. |
| 5,818,934 A | 10/1998 | Cuccia |
| 5,825,879 A | 10/1998 | Davis |
| 5,850,218 A | 12/1998 | LaJoie et al. |
| 5,852,290 A | 12/1998 | Chaney |
| 5,852,470 A | 12/1998 | Kondo et al. |
| 5,870,474 A | 2/1999 | Wasiliewski et al. |
| 5,894,320 A | 4/1999 | Vancelette |
| 5,894,516 A | 4/1999 | Brandenburg |
| 5,915,018 A | 6/1999 | Aucsmith |
| 5,917,830 A | 6/1999 | Chen et al. |
| 5,922,048 A | 7/1999 | Emura |
| 5,923,755 A | 7/1999 | Birch et al. |
| 5,930,361 A | 7/1999 | Hayashi et al. |
| 5,933,500 A | 8/1999 | Blatter et al. |
| 5,940,738 A | 8/1999 | Rao |
| 5,949,877 A | 9/1999 | Traw et al. |
| 5,949,881 A | 9/1999 | Davis |
| 5,963,909 A | 10/1999 | Warren et al. |
| 5,973,679 A | 10/1999 | Abbott et al. |
| 5,973,722 A | 10/1999 | Wakai et al. |
| 5,999,622 A | 12/1999 | Yasukawa et al. |
| 5,999,698 A | 12/1999 | Nakai et al. |
| 6,005,561 A | 12/1999 | Hawkins et al. |
| 6,011,849 A | 1/2000 | Orrin |
| 6,012,144 A | 1/2000 | Pickett |
| 6,016,348 A | 1/2000 | Blatter et al. |
| 6,021,199 A | 2/2000 | Ishibashi |
| 6,021,201 A | 2/2000 | Bakhle et al. |
| 6,026,164 A | 2/2000 | Sakamoto et al. |
| 6,028,932 A | 2/2000 | Park |
| 6,049,613 A | 4/2000 | Jakobsson |
| 6,055,314 A | 4/2000 | Spies et al. |
| 6,055,315 A | 4/2000 | Doyle et al. |
| 6,057,872 A | 5/2000 | Candelore |
| 6,058,186 A | 5/2000 | Enari |
| 6,058,192 A | 5/2000 | Guralnick et al. |
| 6,061,451 A | 5/2000 | Muratani et al. |
| 6,064,748 A | 5/2000 | Hogan |
| 6,065,050 A | 5/2000 | DeMoney |
| 6,069,647 A | 5/2000 | Sullivan et al. |
| 6,070,245 A | 5/2000 | Murphy, Jr. et al. |
| 6,072,872 A | 6/2000 | Chang et al. |
| 6,072,873 A | 6/2000 | Bewick |
| 6,073,122 A | 6/2000 | Wool |
| 6,088,450 A | 7/2000 | Davis et al. |
| 6,105,134 A | 8/2000 | Pinder et al. |
| 6,108,422 A | 8/2000 | Newby et al. |
| 6,115,821 A | 9/2000 | Newby et al. |
| 6,118,873 A | 9/2000 | Lotspiech et al. |
| 6,134,551 A | 10/2000 | Aucsmith |
| 6,138,237 A | 10/2000 | Ruben et al. |

| | | | | | | |
|---|---|---|---|---|---|---|
| 6,148,082 | A | 11/2000 | Slattery et al. | 6,917,684 B1 | 7/2005 | Tatebayashi et al. |
| 6,154,206 | A | 11/2000 | Ludtke | 6,938,162 B2 | 8/2005 | Nagai et al. |
| 6,157,719 | A | 12/2000 | Wasilewski et al. | 6,976,166 B2 * | 12/2005 | Herley et al. ............... 713/165 |
| 6,181,334 | B1 | 1/2001 | Freeman et al. | 7,039,938 B2 | 5/2006 | Candelore |
| 6,185,369 | B1 | 2/2001 | Ko et al. | 7,065,213 B2 | 6/2006 | Pinder |
| 6,185,546 | B1 | 2/2001 | Davis | 7,120,250 B2 | 10/2006 | Candelore |
| 6,189,096 | B1 | 2/2001 | Haverty | 7,124,303 B2 | 10/2006 | Candelore |
| 6,192,131 | B1 | 2/2001 | Geer et al. | 7,127,619 B2 | 10/2006 | Unger et al. |
| 6,199,053 | B1 | 3/2001 | Herbert et al. | 7,139,398 B2 | 11/2006 | Candelore et al. |
| 6,204,843 | B1 | 3/2001 | Freeman et al. | 7,151,831 B2 | 12/2006 | Candelore et al. |
| 6,209,098 | B1 | 3/2001 | Davis | 7,151,833 B2 | 12/2006 | Candelore et al. |
| 6,215,484 | B1 | 4/2001 | Freeman et al. | 7,155,012 B2 | 12/2006 | Candelore et al. |
| 6,226,618 | B1 | 5/2001 | Downs | 2001/0030959 A1 | 10/2001 | Ozawa et al. |
| 6,229,895 | B1 | 5/2001 | Son et al. | 2001/0036271 A1 | 11/2001 | Javed |
| 6,230,194 | B1 | 5/2001 | Frailong et al. | 2001/0051007 A1 | 12/2001 | Teshima |
| 6,230,266 | B1 | 5/2001 | Perlman et al. | 2002/0003881 A1 | 1/2002 | Reitmeier et al. |
| 6,236,727 | B1 | 5/2001 | Ciacelli et al. | 2002/0026587 A1 | 2/2002 | Talstra et al. |
| 6,240,553 | B1 | 5/2001 | Son et al. | 2002/0046406 A1 | 4/2002 | Chelehmal et al. |
| 6,246,720 | B1 | 6/2001 | Kutner et al. | 2002/0047915 A1 | 4/2002 | Misu |
| 6,256,747 | B1 | 7/2001 | Inohara et al. | 2002/0059425 A1 | 5/2002 | Belfiore et al. |
| 6,263,506 | B1 | 7/2001 | Ezaki et al. | 2002/0066101 A1 | 5/2002 | Gordon et al. |
| 6,266,416 | B1 | 7/2001 | Sigbjornsen et al. | 2002/0083317 A1 | 6/2002 | Ohta et al. |
| 6,266,480 | B1 | 7/2001 | Ezaki et al. | 2002/0083438 A1 | 6/2002 | So et al. |
| 6,272,538 | B1 | 8/2001 | Holden et al. | 2002/0097322 A1 | 7/2002 | Monroe et al. |
| 6,278,783 | B1 | 8/2001 | Kocher et al. | 2002/0108035 A1 | 8/2002 | Herley et al. |
| 6,289,455 | B1 | 9/2001 | Kocher et al. | 2002/0116705 A1 | 8/2002 | Perlman et al. |
| 6,292,568 | B1 | 9/2001 | Akins, III et al. | 2002/0126890 A1 | 9/2002 | Katayama et al. |
| 6,292,892 | B1 | 9/2001 | Davis | 2002/0129243 A1 | 9/2002 | Nanjundiah |
| 6,307,939 | B1 | 10/2001 | Vigarie | 2002/0150239 A1 | 10/2002 | Carny et al. |
| 6,311,012 | B1 | 10/2001 | Cho et al. | 2002/0164022 A1 | 11/2002 | Strasser et al. |
| 6,324,288 | B1 | 11/2001 | Hoffman | 2002/0170053 A1 | 11/2002 | Peterka et al. |
| 6,351,538 | B1 | 2/2002 | Uz | 2002/0184506 A1 | 12/2002 | Perlman |
| 6,377,589 | B1 | 4/2002 | Knight et al. | 2002/0194613 A1 | 12/2002 | Unger |
| 6,378,130 | B1 | 4/2002 | Adams | 2002/0196939 A1 | 12/2002 | Unger et al. |
| 6,389,533 | B1 | 5/2002 | Davis et al. | 2003/0002854 A1 | 1/2003 | Belknap et al. |
| 6,389,537 | B1 | 5/2002 | Davis et al. | 2003/0009669 A1 | 1/2003 | White et al. |
| 6,408,076 | B1 * | 6/2002 | Bewick ..................... 380/206 | 2003/0012286 A1 | 1/2003 | Ishtiaq et al. |
| 6,415,031 | B1 * | 7/2002 | Colligan et al. ............ 380/200 | 2003/0021412 A1 | 1/2003 | Candelore et al. |
| 6,415,101 | B1 | 7/2002 | deCarmo et al. | 2003/0026423 A1 | 2/2003 | Unger et al. |
| 6,430,361 | B2 | 8/2002 | Lee | 2003/0026523 A1 | 2/2003 | Unger et al. |
| 6,445,738 | B1 | 9/2002 | Zdepski et al. | 2003/0046686 A1 | 3/2003 | Candelore et al. |
| 6,449,718 | B1 | 9/2002 | Rucklidge et al. | 2003/0059047 A1 | 3/2003 | Iwamura |
| 6,453,115 | B1 | 9/2002 | Boyle | 2003/0063615 A1 | 4/2003 | Luoma et al. |
| 6,456,985 | B1 | 9/2002 | Ohtsuka | 2003/0072555 A1 | 4/2003 | Yap et al. |
| 6,459,427 | B1 | 10/2002 | Mao et al. | 2003/0077071 A1 | 4/2003 | Lin et al. |
| 6,463,152 | B1 | 10/2002 | Takahashi | 2003/0081630 A1 | 5/2003 | Mowery et al. |
| 6,466,671 | B1 | 10/2002 | Maillard et al. | 2003/0081776 A1 | 5/2003 | Candelore |
| 6,505,032 | B1 | 1/2003 | McCorkle et al. | 2003/0084284 A1 | 5/2003 | Ando et al. |
| 6,505,299 | B1 | 1/2003 | Zeng et al. | 2003/0097662 A1 | 5/2003 | Russ et al. |
| 6,510,554 | B1 | 1/2003 | Gorden et al. | 2003/0112333 A1 | 6/2003 | Chen et al. |
| 6,519,693 | B1 | 2/2003 | Debey | 2003/0118243 A1 | 6/2003 | Sezer et al. |
| 6,529,526 | B1 | 3/2003 | Schneidewend | 2003/0123664 A1 | 7/2003 | Pedlow, Jr. et al. |
| 6,543,053 | B1 | 4/2003 | Li et al. | 2003/0123849 A1 | 7/2003 | Nallur et al. |
| 6,549,229 | B1 | 4/2003 | Kirby et al. | 2003/0126086 A1 | 7/2003 | Safadi |
| 6,557,031 | B1 | 4/2003 | Mimura et al. | 2003/0133570 A1 | 7/2003 | Candelore et al. |
| 6,587,561 | B1 | 7/2003 | Sered et al. | 2003/0140257 A1 | 7/2003 | Peterka et al. |
| 6,590,979 | B1 * | 7/2003 | Ryan .......................... 380/210 | 2003/0145329 A1 | 7/2003 | Candelore |
| 6,640,145 | B2 | 10/2003 | Hoffberg et al. | 2003/0152224 A1 | 8/2003 | Candelore et al. |
| 6,650,754 | B2 | 11/2003 | Akiyama et al. | 2003/0152226 A1 | 8/2003 | Candelore et al. |
| 6,654,389 | B1 | 11/2003 | Brunheroto et al. | 2003/0156718 A1 | 8/2003 | Candelore et al. |
| 6,678,740 | B1 | 1/2004 | Rakib et al. | 2003/0159139 A1 | 8/2003 | Candelore et al. |
| 6,681,326 | B2 | 1/2004 | Son et al. | 2003/0159140 A1 | 8/2003 | Candelore |
| 6,684,250 | B2 | 1/2004 | Anderson et al. | 2003/0159152 A1 | 8/2003 | Lin et al. |
| 6,697,489 | B1 | 2/2004 | Candelore | 2003/0174837 A1 | 9/2003 | Candelore et al. |
| 6,697,944 | B1 | 2/2004 | Jones et al. | 2003/0174844 A1 | 9/2003 | Candelore |
| 6,714,650 | B1 | 3/2004 | Maillard et al. | 2003/0188154 A1 | 10/2003 | Dallard |
| 6,754,276 | B1 | 6/2004 | Harumoto et al. | 2003/0190054 A1 * | 10/2003 | Troyansky et al. ......... 382/100 |
| 6,772,340 | B1 | 8/2004 | Peinado et al. | 2003/0193973 A1 | 10/2003 | Takashimizu et al. |
| 6,788,690 | B2 | 9/2004 | Harri | 2003/0198223 A1 | 10/2003 | Mack et al. |
| 6,826,185 | B1 | 11/2004 | Montanaro et al. | 2003/0204717 A1 | 10/2003 | Kuehnel |
| 6,891,565 | B1 | 5/2005 | Dieterich | 2003/0222994 A1 | 12/2003 | Dawson |
| 6,895,128 | B2 | 5/2005 | Bohnenkamp | 2003/0226149 A1 | 12/2003 | Chun et al. |
| 6,904,520 | B1 | 6/2005 | Rosset et al. | 2003/0228018 A1 | 12/2003 | Vince |

| | | | |
|---|---|---|---|
| 2004/0003008 A1 | 1/2004 | Wasilewski et al. |
| 2004/0010717 A1 | 1/2004 | Simec et al. |
| 2004/0021764 A1 | 2/2004 | Driscoll, Jr. et al. |
| 2004/0028227 A1 | 2/2004 | Yu |
| 2004/0047470 A1 | 3/2004 | Candelore |
| 2004/0049688 A1 | 3/2004 | Candelore et al. |
| 2004/0049690 A1 | 3/2004 | Candelore et al. |
| 2004/0049691 A1 | 3/2004 | Candelore et al. |
| 2004/0049694 A1 | 3/2004 | Candelore |
| 2004/0064688 A1* | 4/2004 | Jacobs ......................... 713/150 |
| 2004/0068659 A1 | 4/2004 | Diehl |
| 2004/0073917 A1 | 4/2004 | Pedlow, Jr. et al. |
| 2004/0078575 A1 | 4/2004 | Morten et al. |
| 2004/0081333 A1 | 4/2004 | Grab et al. |
| 2004/0086127 A1 | 5/2004 | Candelore |
| 2004/0088552 A1 | 5/2004 | Candelore |
| 2004/0088558 A1 | 5/2004 | Candelore |
| 2004/0091109 A1 | 5/2004 | Son et al. |
| 2004/0100510 A1 | 5/2004 | Milic-Frayling et al. |
| 2004/0123094 A1 | 6/2004 | Sprunk |
| 2004/0136532 A1 | 7/2004 | Pinder et al. |
| 2004/0139337 A1 | 7/2004 | Pinder et al. |
| 2004/0141314 A1 | 7/2004 | Candelore |
| 2004/0158721 A1 | 8/2004 | Candelore |
| 2004/0165586 A1 | 8/2004 | Read et al. |
| 2004/0181666 A1 | 9/2004 | Candelore |
| 2004/0187161 A1 | 9/2004 | Cao |
| 2004/0193550 A1 | 9/2004 | Siegal |
| 2004/0240668 A1 | 12/2004 | Bonan et al. |
| 2004/0267602 A1 | 12/2004 | Gaydos et al. |
| 2005/0004875 A1 | 1/2005 | Konito et al. |
| 2005/0028193 A1 | 2/2005 | Candelore et al. |
| 2005/0036067 A1 | 2/2005 | Ryal et al. |
| 2005/0063541 A1 | 3/2005 | Candelore |
| 2005/0066357 A1 | 3/2005 | Ryal |
| 2005/0071669 A1 | 3/2005 | Medvinsky et al. |
| 2005/0094808 A1* | 5/2005 | Pedlow et al. ............... 380/200 |
| 2005/0094809 A1 | 5/2005 | Pedlow, Jr. et al. |
| 2005/0097596 A1 | 5/2005 | Pedlow, Jr. |
| 2005/0097597 A1 | 5/2005 | Pedlow, Jr. et al. |
| 2005/0097598 A1 | 5/2005 | Pedlow, Jr. et al. |
| 2005/0097614 A1 | 5/2005 | Pedlow, Jr. et al. |
| 2005/0102702 A1 | 5/2005 | Candelore et al. |
| 2005/0129233 A1 | 6/2005 | Pedlow, Jr. |
| 2005/0141713 A1* | 6/2005 | Genevois .................... 380/239 |
| 2005/0169473 A1 | 8/2005 | Candelore |
| 2005/0192904 A1 | 9/2005 | Candelore |
| 2005/0259813 A1 | 11/2005 | Wasilewski et al. |
| 2005/0265547 A1 | 12/2005 | Strasser et al. |
| 2006/0115083 A1 | 6/2006 | Candelore et al. |
| 2006/0130119 A1 | 6/2006 | Candelore et al. |
| 2006/0130121 A1 | 6/2006 | Candelore et al. |
| 2006/0136976 A1 | 6/2006 | Coupe et al. |
| 2006/0153379 A1 | 7/2006 | Candelore et al. |
| 2006/0168616 A1 | 7/2006 | Candelore |
| 2006/0174264 A1 | 8/2006 | Candelore |
| 2006/0262926 A1 | 11/2006 | Candelore et al. |
| 2006/0269060 A1 | 11/2006 | Candelore et al. |

FOREIGN PATENT DOCUMENTS

| | | |
|---|---|---|
| EP | 0527611 | 7/1992 |
| EP | 0558016 | 2/1993 |
| EP | 0596826 | 4/1993 |
| EP | 0610587 | 12/1993 |
| EP | 0680209 | 4/1995 |
| EP | 0674440 | 9/1995 |
| EP | 0674441 | 9/1995 |
| EP | 0833517 | 4/1998 |
| EP | 0866615 | 9/1998 |
| EP | 1187483 | 3/2002 |
| JP | 7067028 | 3/1995 |
| JP | 11243534 | 10/2002 |
| WO | WO 86/07224 | 12/1986 |
| WO | WO 94/10775 | 5/1994 |
| WO | WO 97/38530 | 10/1997 |
| WO | WO 00/31964 | 6/2000 |
| WO | WO 01/65762 | 9/2001 |
| WO | WO 01/78386 | 10/2001 |

OTHER PUBLICATIONS

Yip, Kun-Wah, Partial-encryption technique for intellectual property protection of FPGA-Based products, Dec. 15, 1999, IEEE, pp. 183-190.

International Search Report for application No. PCT/US2004/032228.

"A Report on Security Issues in Multimedia" by Gulwani, pp. 10-14, Apr. 30, 2000, Course Notes, Department of Computer Science and Engineering, Indian Istitute of Technology Kanpur.

"Ad Agencies and Advertisers To Be Empowered with Targeted Ads Delivered by Television's Prevailing Video Servers" Article Business Section of The New York Times, Updated Thursday, Dec. 20, 2001.

"An Efficient MPEG Video Encryption Algorithm" by Shi and Bhargava, pp. 381-386, 1998 IEEE.

"An Empirical Study of Secure MPEG Video Transmissions" by Agi and Gong, pp. 137-144, 1996, IEEE, Proceedings of SNDSS '96.

"Applying Encryption to Video Communication" by Kunkelmann, pp. 41-47, Sep. 1998, Multimedia and Security Workshop at ACM Multimedia '98. Bristol, U.K.

"Comparison of MPEG Encryption Algorithms" by Qiao and Nahrstedt, Jan. 17, 1998, Preprint submitted to Elsevier Science.

"Coral Consortium Aims to Make DRM Interoperable", by Bill Rosenblatt, Oct. 7, 2004, online at http://www.drmwatch.com/standards/article.php/3418741.

"DVD Demystified—The Guidebook for DVD-Video and DVD-ROM" by Jim Taylor, Pub. McGraw-Hill, 1998, ISBN: 0-07-064841-7, pp. 134-147.

"Dynamic-Customized TV Advertising Creation and Production Tools" by SeaChange International, Web Site Literature.

"Efficient Frequency Domain Video Scrambling for Content Access Control" by Zeng and Lei, Nov. 1999, In Proc. ACM Multimedia.

"Evaluation of Selective Encryption Techniques for Secure Transmission of MPEG-Compressed Bit-Streams" by Alattar and Al-Regib, pp. IV-340 to IV-343, 1999, IEEE.

"Fast Encryption Methods for Audiovisual Data Confidentiality" by Wu and Kuo, Nov. 2000, SPIE International Symposia on Information Technologies 2000, (Boston, Ma., USA).

"Improved Selective Encryption Techniques for Secure Transmission of MPEG Video Bit-Streams" by Alattar, Al-Regib and Al-Semari, pp. 256-260, 1999, IEEE.

Metro Media™ PVR-DVD-MP3-Web—Internet publication from www.metrolink.com, undated.

"Multimedia and Security Workshop at ACM Multimedia '98. Bristol, U.K., Sep. 1998.

"Passage™, Freedom to Choose", 2003, Sony Electronics Inc.

"Performance Study of a Selective Encryption Scheme for the Security of Networked, Real-Time Video" by Spanos and Maples, pp. 2-10, 1995, IEEE.

"Pre-Encryption Profiles—Concept Overview and Proposal", Rev. 1.2 as submitted to the Open CAS consortium on Dec. 28, 2000.

"Run-Time Performance Evaluation for a Secure MPEG System Supporting Both Selective Watermarking and Encryption" by Wu and Wu, Mar. 1, 1997, submitted to JSAC special issue on Copyright and Privacy Protection.

"Selective Encryption and Watermarking of MPEG Video (Extended Abstract)" by Wu and Wu, Feb. 17, 1997, submitted to International Conference on Image Science, Systems, and Technology, CISST'97.

"The Long March to Interoperable Digital Rights Management" by Koenen et al., pp. 1-17, 2004, IEEE.

"Transport Streams Insertion of Video in the Compressed Digital Domain" by SeaChange International, Web Site Literature, 2000.

"Visible World—A High Impact Approach to Customized Television Advertising" by Haberman, Dec. 2001.
ANONYMOUS, Message Authentication with Partial Encryption, Research discosure RD 296086, Dec. 10, 1998.
McCormac Hack Over Cablemodem, HackWatchAug. 10, 1998.
ANONYMOUS, New Digital Copy Protection Proposal Would Secure Authorized Copies, PR Newswire, Nov. 1998, pp. 1-3.
Aravind, H., et al., "Image and Video Coding Standards", AT&T Technical Journal, (Jan./Feb. 1993), 67-68.
Gonzalez, R. C., et al., "Digital Image Processing", Addison Wesley Publishing Company, Inc., (1992),346-348.
Kim, et al., "Bit Rate Reduction Algorithm for a Digital VCR", IEEE Transactions on Consumer Electronics, vol. 37, No. 3, (Aug. 1, 1992),267-274.
Kondo, et al., "A New Concealment Method for Digital VCRs", IEEE Visual Signal Processing and Communication, Melbourne, Australia,(Sep. 1993),20-22.
Kondo, et al., "Adaptive Dynamic Range Coding Scheme for Future Consumer Digital VTR", 219-226.
Kondo, et al., "Adaptive Dynamic Range Coding Scheme for Future HDTV Digital VTR", Sony Corporation, (1991).
Lakshiminath, et al., "Dual Protocol for Scalable Secure Multicasting", 1999 International Symposium on Computers and Comminication, Jul. 6-8, 1999.
Lookabaugh et al., "Selective Encryption and MPEG-2", ACM Multimedia '03, Nov. 2003.
Menezes, Alfred J., et al., "Handbook of Applied Cryptography", CRC Press, 551-553.
NHK Laboratories Note, "Error Correction, Concealment and Shuffling", No. 424, (Mar. 1994),29-44.
Park, et al., "A Simple Concealment for ATM Bursty Cell Loss", IEEE Transactions on Consumer Electronics, No. 3, (Aug. 1993),704-709.
Robert et al., "Digital Cable: The Key to Your Content", Access Intelligence's Cable Group, Feb. 2002, online at http:www.cableworld.com/ct/archives/0202digitalrights.htm.
Tom, et al., "Packet Video for Cell Loss Protection Using Deinterleaving and Scrambling", ICASSP 91: 1991 International Conference in Acoustics, Speech and Signal Processing, vol. 4, (Apr. 1991), 2857-2860.
Zhu, et al., "Coding and Cell-Loss Recovery in DCT-Based Packet Video", IEEE Transactions in Circuits and Systems for Video Technology, No. 3, NY, (Jun. 3, 1993.
"ClearPlay: The Technology of Choice", from web site, ClearPlay 2001-2003.
"McCormac Hack Over Cablemode", Hackwatch, Aug. 10, 1998.
McCormac Hack Over Cablemodem, HackWatchAug. 10, 1998.
Anonymous, New Digital Copy Protection Proposal Would Secure Authorized Copies, PR Newswire, Nov. 1998, pp. 1-3.
Aravind, H., et al., "Image and Video Coding Standards", AT&T Technical Journal, (Jan./Feb. 1993),67-68.
Gonzalez, R. C., et al., "Digital Image Processing", Addison Wesley Publishing Company, Inc., (1992),346-348.
Kim, et al., "Bit Rate Reduction Algorithm for a Digital VCR", IEEE Transactions on Consumer Electronics, vol. 37, No. 3, (Aug. 1, 1992),267-274.
Kondo, et al., "A New Concealment Method for Digital VCRs", IEEE Visual Signal Processing and Communication, Melbourne, Australia,(Sep. 1993),20-22.
Kondo, et al., "Adaptive Dynamic Range Coding Scheme for Future Consumer Digital VTR", 219-226-1998.
Kondo, et al., "Adaptive Dynamic Range Coding Scheme for Future HDTV Digital VTR", Sony Corporation, (1991).
Lakshiminath, et al., "A Dual Protocol for Scalable Secure Multicasting", 1999 International Symposium on Computers and Communication, Jul. 6-8, 1999.
Lookabaugh et al., "Selective Encryption and MPEG-2", ACM Multimedia '03, Nov. 2003.
Menezes, Alfred J., et al., "Handbook of Applied Cryptography", CRC Press, 551-553-1996.
NHK Laboratories Note, "Error Correction, Concealment and Shuffling", No. 424, (Mar. 1994),29-44.
Park, et al., "A Simple Concealment for ATM Bursty Cell Loss", IEEE Transactions on Consumer Electronics, No. 3, (Aug. 1993),704-709.
Robert et al., "Digital Cable: The Key to Your Content", Access Intelligence's Cable Group, Feb. 2002, online at http:www.cableworld.com/ct/archives/0202/0202digitalrights.htm.
Tom, et al., "Packet Video for Cell Loss Protection Using Deinterleaving and Scrambling", ICASSP 91: 1991 International Conference on Acoustics, Speech and Signal Processing, vol. 4, (Apr. 1991),2857-2860.
Zhu, et al., "Coding and Cell-Loss Recovery in DCT-Based Packet Video", IEEE Transactions on Circuits and Systems for Video Technology, No. 3, NY,(Jun. 3, 1993).
"ClearPlay: The Technology of Choice", from web site, ClearPlay 2001-2003.
"An Empirical Study of Secure MPEG Video Transmissions" by Agi and Gong, pp. 137-144, 1996, IEEE, Proceedings of SNDSS '96.
"Applying Encryption to Video Communication" by Kunkelmann, pp. 41-47, Sep. 1998, Multimedia and Security Workshop at ACM Multimedia '98. Bristol, U.K.
"Comparison of MPEG Encryption Algorithms" by Qiao and Nahrstedt, Jan. 17, 1998, Preprint submitted to Elsevier Science.
"Coral Consortium Aims to Make DRM Interoperable", by Bill Rosenblatt, Oct. 7, 2004, online at http://www.drmwatch.com/standards.article.php/3418741.
"DVD Demystified—The Guidebook for DVD-Video and DVD-ROM" by Jim Taylor, Pub. McGraw-Hill, 1998, ISBN: 0-07-064841-7, pp. 134-147.
"Dynamic-Customized TV Advertising Creation and Production Tools" by SeaChange International, Web Site Literature—2002.
"Efficient Frequency Domain Video Scrambling for Content Access Control" by Zeng and Lei, Nov. 1999, In Proc. ACM Multimedia.
"Evaluation of Selective Encryption Techniques for Secure Transmission of MPEG-Compressed Bit-Streams" by Alattar and Al-Regib, pp. IV-340 to IV-343, 1999, IEEE.
"Fast Encryption Methods for Audiovisual Data Confidentiality" by Wu and Kuo, Nov. 2000, SPIE International Symposia on Information Technologies 2000, (Boston, Ma., USA).
"Improved Selective Encryption Techniques for Secure Transmissions of MPEG Video Bit-Streams" by Alattar, Al-Regib and Al-Semari, pp. 256-260, 1999, IEEE.
Metro Media™ PVR-DVD-MP3-Web—Internet publication from www.metrolink.com, undated—2001.
"Multimedia and Security Workshop at ACM Multimedia" '98. Bristol, U.K., Sep. 1998.
"Passage™, Freedom to Choose", 2003, Sony Electronics Inc.
"Performance Study of a Selective Encryption Scheme for the Security of Networked, Real-Time Video" by Spanos and Maples, pp. 2-10, 1995, IEEE.
"Pre-Encryption Profiles—Concept Overview and Proposal", Rev. 1.2 as submitted to the Open CAS consortium on Dec. 28, 2000.
"Run-Time Performance Evaluation for a Secure MPEG System Supporting Both Selective Watermarking and Encryption" by Wu and Wu, Mar. 1, 1997, submitted to JSAC special issue on Copyright and Privacy Protection.
"Selective Encryption and Watermarking of MPEG Video (Extended Abstract)" by Wu and Wu, Feb. 17, 1997, submitted to International Conference on Image Science, Systems, and Technology, CISST'97.
"The Long March to Interoperable Digital Rights Management" by Koenen et al., pp. 1-17, 2004, IEEE.
"Transport Streams Insertion of Video in the Compressed Digital Domain" by SeaChange International, Web Site Literature, 2000.
"Visible World—A High Impact Approach to Customized Television Advertising" by Haberman, Dec. 2001.
Anonymous, Message Authentication with Partial Encryption, Research discosure RD 296086, Dec. 10, 1998.

* cited by examiner

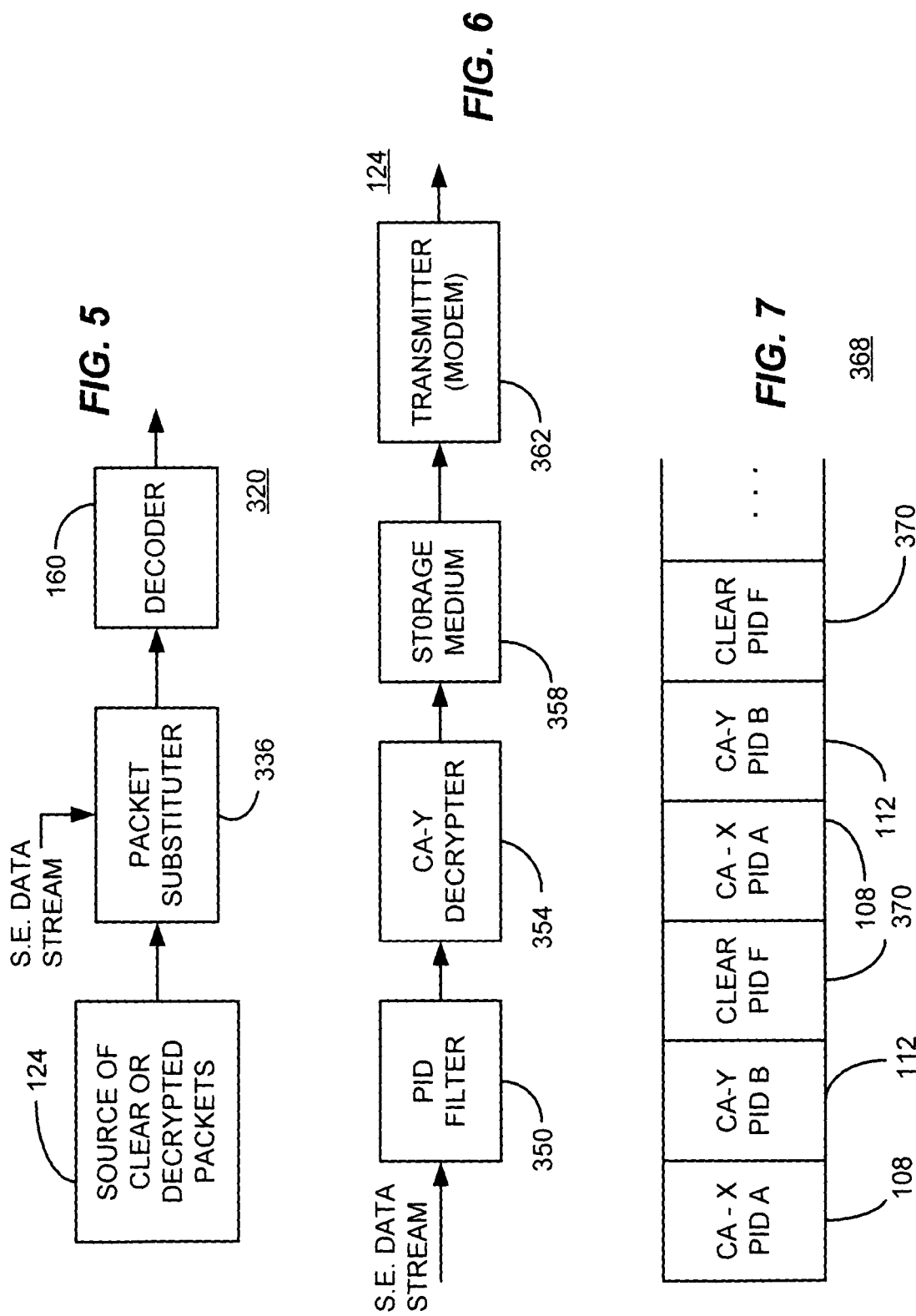

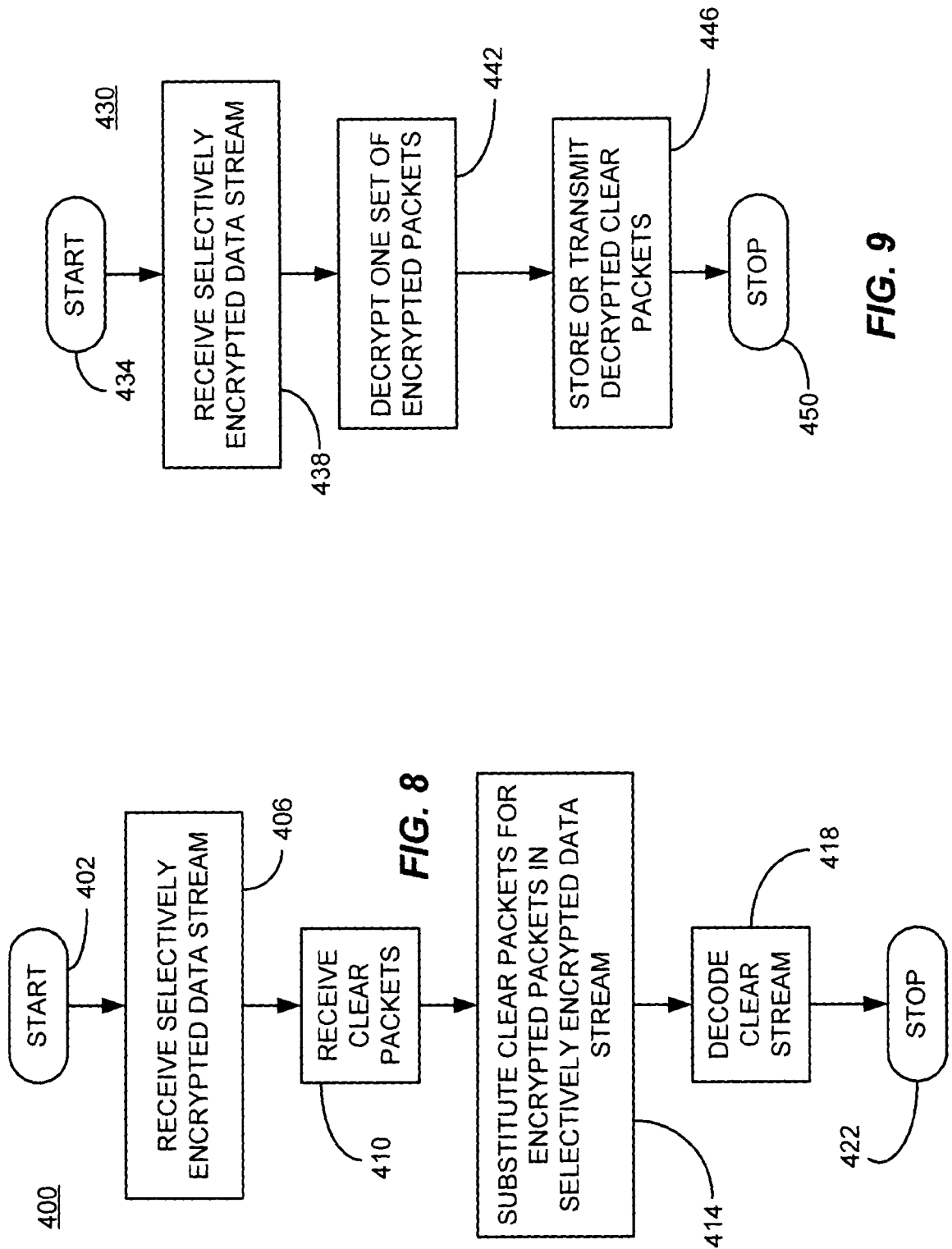

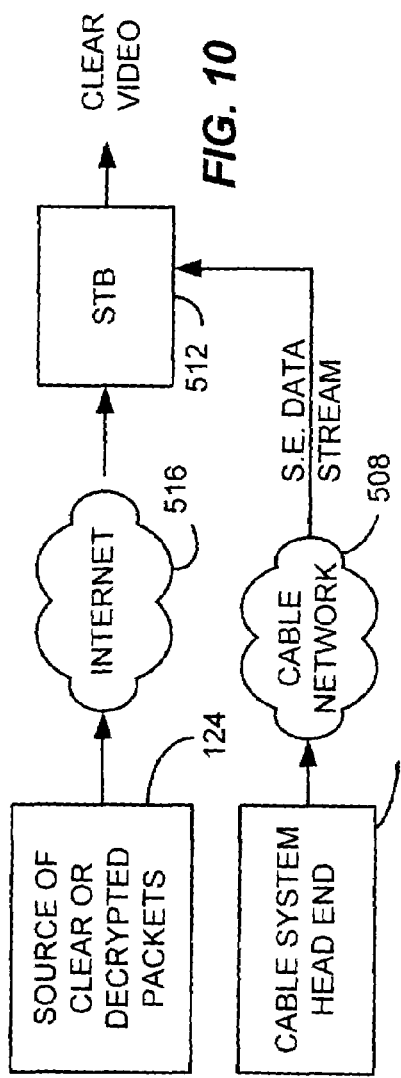
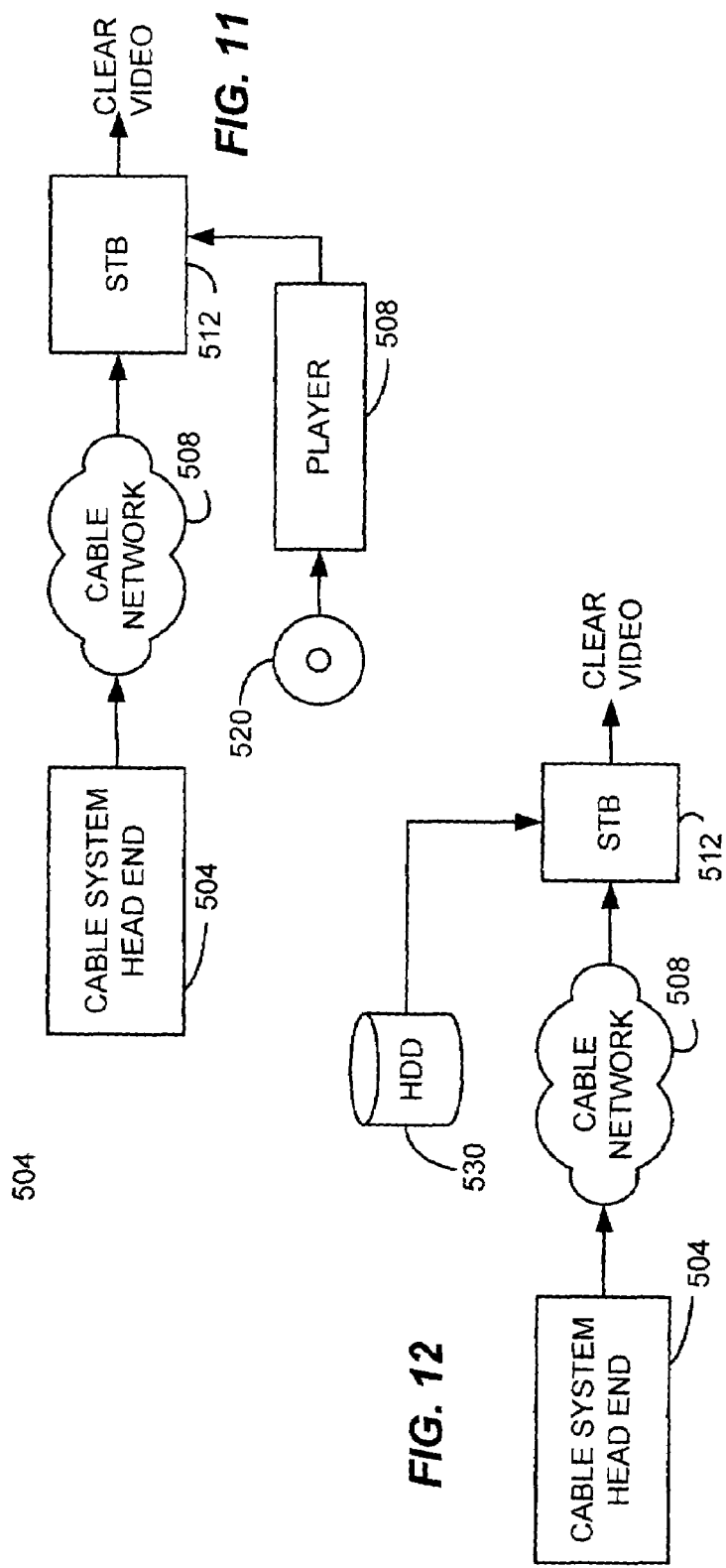

DECRYPTION SYSTEM

CROSS REFERENCE TO RELATED DOCUMENTS

This application is related to the following copending patent applications which are hereby incorporated herein by reference.

Ser. No. 10/038,217 filed Jan. 2, 2002,
Ser. No. 10/038,032 filed Jan. 2, 2002,
Ser. No. 10/037,914 filed Jan. 2, 2002,
Ser. No. 10/037,499 filed Jan. 2, 2002,
Ser. No. 10/037,498 filed Jan. 2, 2002,
Ser. No. 10/084,106 filed Feb. 2, 2002,
Ser. No. 10/273,905 filed Oct. 18, 2002,
Ser. No. 10/273,903 filed Oct. 18, 2002,
Ser. No. 10/273,875 filed Oct. 18, 2002,
Ser. No. 10/274,084 filed Oct. 18, 2002,
Ser. No. 10/273,904 filed Oct. 18, 2002,
Ser. No. 10/274,019 filed Oct. 18, 2002,
Ser. No. 10/293,761 filed Nov. 13, 2002,
Ser. No. 10/303,594 filed Nov. 25, 2002,
Ser. No. 10/319,133 filed Dec. 13, 2002,
Ser. No. 10/319,066 filed Dec. 13, 2002,
Ser. No. 10/318,782 filed Dec. 13, 2002,
Ser. No. 10/319,169 filed Dec. 13, 2002,
Ser. No. 10/391,940 filed Mar. 19, 2003,
Ser. No. 10/393,324 filed Mar. 20, 2003.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Selective encryption systems, including but not limited to dual or multiple selective encryption systems are disclosed in the above-referenced patent applications. Such systems are useful in providing encryption of program material under multiple conditional access systems.

The above-referenced commonly owned patent applications describe inventions relating to various aspects of methods generally referred to herein as partial encryption or selective encryption. More particularly, systems are described therein wherein selected portions of a particular selection of digital content are encrypted using two (or more) encryption techniques while other portions of the content are left unencrypted. By properly selecting the portions to be encrypted, the content can effectively be encrypted for use under multiple decryption systems without the necessity of encryption of the entire selection of content. In some embodiments, only a few percent of data overhead is needed to effectively encrypt the content using multiple encryption systems. This results in a cable or satellite system being able to utilize Set-top boxes or other implementations of conditional access (CA) receivers from multiple manufacturers in a single system—thus freeing the cable or satellite company to competitively shop for providers of Set-top boxes.

BRIEF DESCRIPTION OF THE DRAWINGS

Certain illustrative embodiments of the invention illustrating organization and method of operation, together with objects and advantages thereof, may be best understood by reference detailed description that follows taken in conjunction with the accompanying drawings in which:

FIG. 5 is another embodiment of a decoder system consistent with certain embodiments of the present invention.

FIG. 6 is a block diagram of a system for generating a stream or file of clear packets in a manner consistent with certain embodiments of the present invention.

FIG. 7 is a diagram showing another arrangement of clear packets that can be used in certain embodiments consistent with of the present invention.

FIG. 8 is a flow chart of a decoding method consistent with certain embodiments of the present invention.

FIG. 9 is a flow chart of a clear packet generation method consistent with certain embodiments of the present invention.

FIG. 10 is a block diagram of a decoding system consistent with certain embodiments of the present invention.

FIG. 11 is a block diagram of another decoding system consistent with certain embodiments of the present invention.

FIG. 12 is a block diagram of another decoding system consistent with certain embodiments of the present invention.

DETAILED DESCRIPTION

Figure 1:
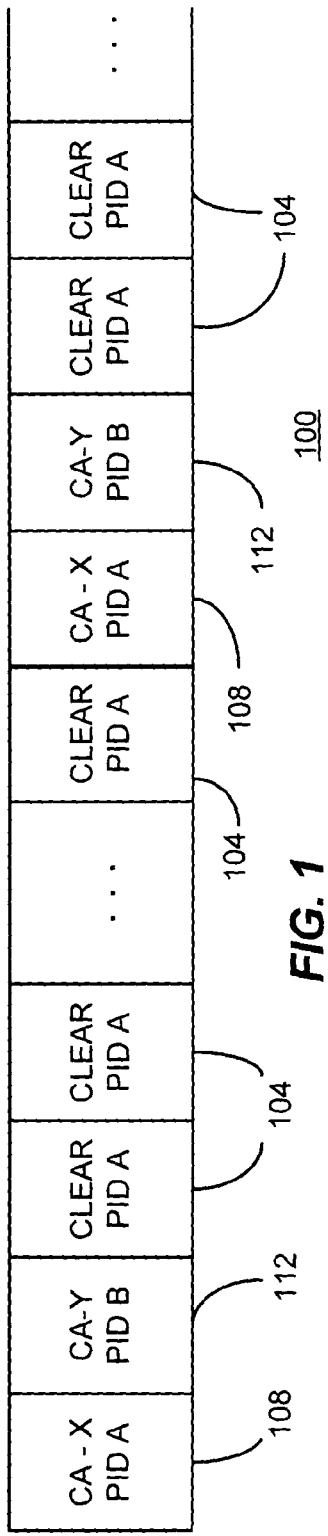
FIG. 1 is a diagram depicting a dual selectively encrypted data stream consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles of the invention and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The terms "scramble" and "encrypt" and variations thereof are used synonymously herein. Also, the term "television program" and similar terms can be interpreted in the normal conversational sense, as well as a meaning wherein the term means any segment of A/V content that can be displayed on a television set or similar monitor device. The term "video" is often used herein to embrace not only true visual information, but also in the conversational sense (e.g., "video tape recorder") to embrace not only video signals but associated audio and data. The term "legacy" as used herein refers to existing technology used for existing cable and satellite systems. The exemplary embodiments disclosed herein are decoded by a television Set-Top Box (STB), but it is contemplated that such technology will soon be incorporated within television receivers of all types whether housed in a separate enclosure alone or in conjunction with recording and/or playback equipment or Conditional Access (CA) decryption module or within a television set itself. The present document generally uses the example of a "dual partial encryption" embodiment, but those skilled in the art will recognize that the present invention can be utilized to realize multiple partial encryption without departing from the invention. Partial encryption and selective encryption are used synonymously herein.

The selective encryption processes described in the above patent applications utilize any suitable encryption method. However, these encryption techniques are selectively applied to the data stream, rather than encrypting the entire data stream, using techniques described in the above-referenced patent applications. In general, but without the intent to be limiting, the selective encryption process utilizes intelligent selection of information to encrypt so that the entire program does not have to undergo dual encryption. By appropriate selection of data to encrypt, the program material can be effectively scrambled and hidden from those who desire to hack into the system and illegally recover commercial content without paying. MPEG (or similar format) data that are used to represent the audio and video data does so using a high degree of reliance on the redundancy of information from frame to frame. Certain data can be transmitted as "anchor" data representing chrominance and luminance data. That data is then often simply moved about the screen to generate subsequent frames by sending motion vectors that describe the movement of the block. Changes in the chrominance and luminance data are also encoded as changes rather than a recoding of absolute anchor data. Thus, encryption of this anchor data, for example, or other key data can effectively render the video un-viewable.

In accordance with certain embodiments consistent with the above inventions, the selected video data to be encrypted may be any individual one or combination of the following (described in greater detail in the above applications): video slice headers appearing in an active region of a video frame, data representing an active region of a video frame, data in a star pattern within the video frame, data representing scene changes, I Frame packets, packets containing motion vectors in a first P frame following an I Frame, packets having an intra_slice_flag indicator set, packets having an intra_slice indicator set, packets containing an intra_coded macroblock, data for a slice containing an intra_coded macroblock, data from a first macroblock following the video slice header, packets containing video slice headers, anchor data, and P Frame data for progressively refreshed video data, data arranged in vertical and or horizontal moat patterns on the video frame, and any other selected data that renders the video and/or audio difficult to utilize. Several such techniques as well as others are disclosed in the above-referenced patent applications, any of which (or other techniques) can be utilized with the present invention to encrypt only a portion of the content.

In order to distinguish between the two or more digital television signals encrypted using the multiple encryption algorithms in accordance with certain embodiments consistent with the above inventions, multiple packet identifiers (PIDs) are utilized. This is illustrated in the dual selectively encrypted data stream shown in FIG. 1 as data stream 100. Normally a single set of packet identifiers is used to identify a data stream associated with a particular television program. When a television signal or other content is encrypted under the multiple selective encryption arrangement described in the above-referenced applications, the clear content shown as packets 104 is assigned a first set of PIDs (PID A), and each set of encrypted content is assigned another set of PIDs. In this example, one set of encrypted content shown as packets 108 encrypted under a first conditional access (CA) encryption system (CA system X) may share the same PID (PID A) with the unencrypted content, but this should not be considered limiting. CA system X may, for example represent a so called "legacy" encryption system. A second set of encrypted content shown as packets 112 is encrypted under a second CA encryption system (CA system Y) and encoded with a second PID (PID B). In this example, consecutive packets 108 and 112 contain the same content encrypted under two different CA systems.

Figure 2:
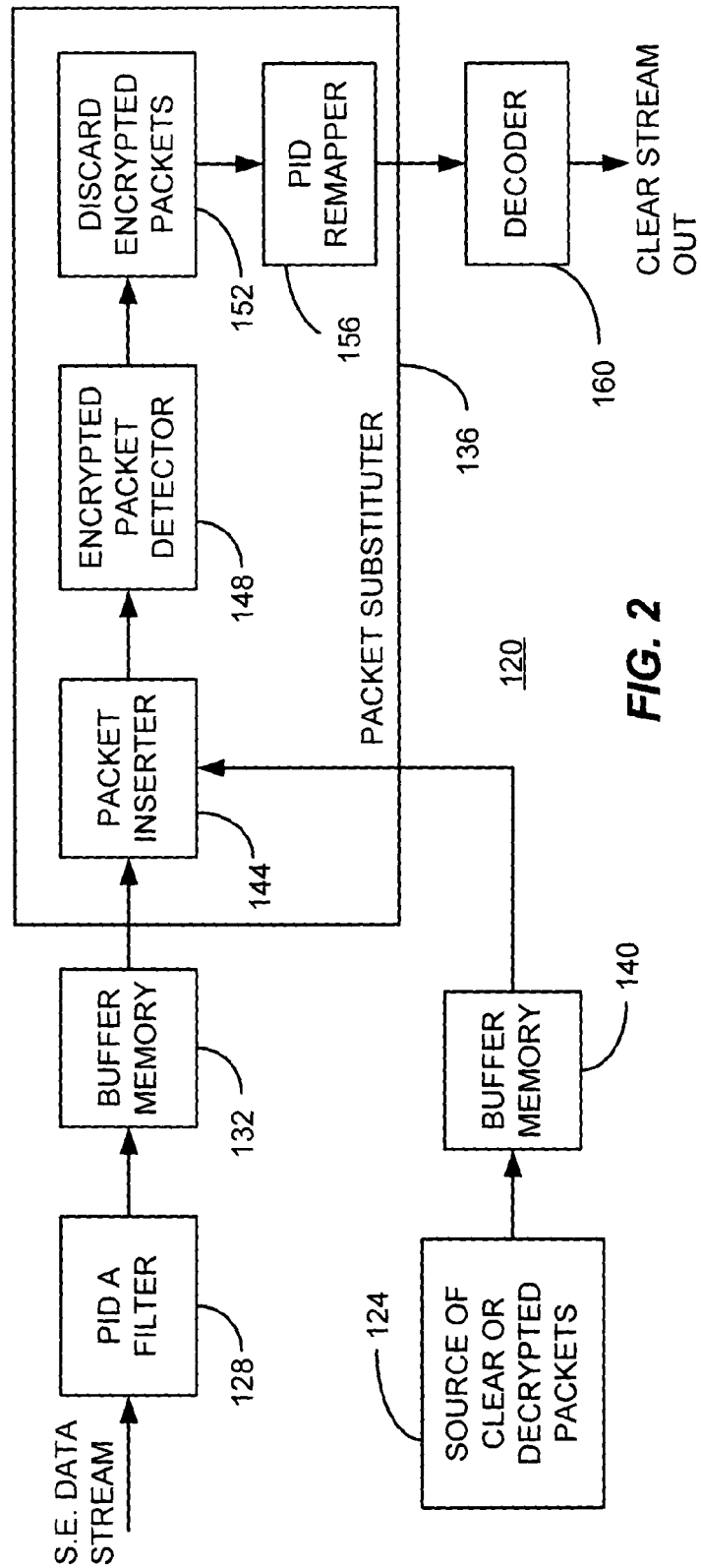
FIG. 2 is a block diagram of a decoding system consistent with certain embodiments of the present invention.

Turning now to FIG. 2, a device 120 is depicted in which a source of clear packets 124 is utilized to provide a set of clear packets from a selectively encrypted stream of packets. In this exemplary embodiment, a selectively encrypted data stream such as 100 is received as an input (e.g., through a tuner and a receiver device forming a part of a television Set-Top Box (STB) or other video receiver system. The stream of selectively encrypted data is processed by a PID filter 128 which selects, for example, the stream of data represented by values of PID equal to PID A in stream 100. In this example, the output of the PID filter 128 would have only packets identified by PID A. This stream of data having only PID A is buffered in a buffer memory 132 in certain embodiments before being provided to a packet substitution circuit 136. Packet substitution circuit 136 also receives an input from the source of clear or decrypted packets 124, which may be buffered at buffer memory 140.

In accord with certain embodiments, the source of clear or decrypted packets 124 may be a magnetic, optical or magneto-optical or semiconductor storage device, for example, a CD ROM (Compact Disc Read Only Memory) or a hard disk drive or an Flash ROM. In other embodiments, the source of clear or decrypted packets may be a remote source that streams or otherwise transmits the clear or decrypted packets over a network such as the Internet. Such packets may be transmitted over either a wideband or a dial-up connection.

In this example, the source of clear packets may be encoded with PID B or some other PID to identify the packets. Such clear or decrypted packets having PID B are provided to the packet substituter 136 where they are inserted into place in the data stream containing PID A packets by a packet inserter 144. The packets should preferably be inserted at a position adjacent the encrypted packets with PID A. Thus, at the output of packet inserter 144 a data stream similar to that of FIG. 1 appears except that the packets 112 having PID B are now in the clear rather than being encrypted.

From here, the stream can be converted to a clear data stream by detecting the encrypted packets with PID A at encrypted packet detector 148 and discarding those packets at 152. Since encrypted packets can contain a flag bit that indicates that the packet is encrypted, the process of detecting and discarding the encrypted packets is a simple matter of reading the encryption flag and discarding all encrypted packets. At this point, the data stream contains packets with PID A which are clear and Packets with PID B which are also clear. In order to use certain standard decoders (e.g., an MPEG decoder), such as 160, it may be desirable that all packets in a particular elementary stream have the same PID. Thus, at 156, the packets having PID B can be re-mapped to have PID A. This produces a clear data stream with all packets having PID A and all packets being unencrypted. In other embodiments, decoder 160 can be programmed to accept multiple PIDs in the same data stream. This process can be carried out in a circuit 120 without need for a decryptor since no decryption actually takes place at the device 120.

Figure 3:
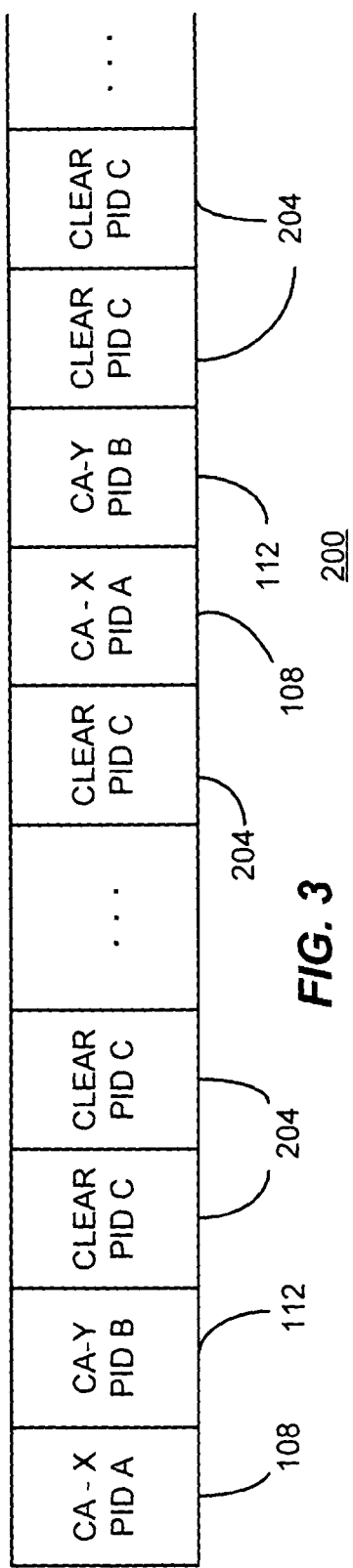
FIG. 3 is a drawing depicting another embodiment of a dual selectively encrypted data stream consistent with certain embodiments of the present invention.

It will be appreciated by one skilled in the art upon consideration of the present teaching that other configurations of data in the selectively encrypted data stream can be decoded using the same, similar or analogous circuitry. One example of another configuration of a selectively encrypted data stream is depicted in FIG. 3 as data stream 200. In this exemplary embodiment, the selectively encrypted packets 108 having PID A encrypted under CA system X and the selectively encrypted packets 112 having PID B encrypted under CA system Y are combined with clear packets 204 having PID C.

Figure 4:
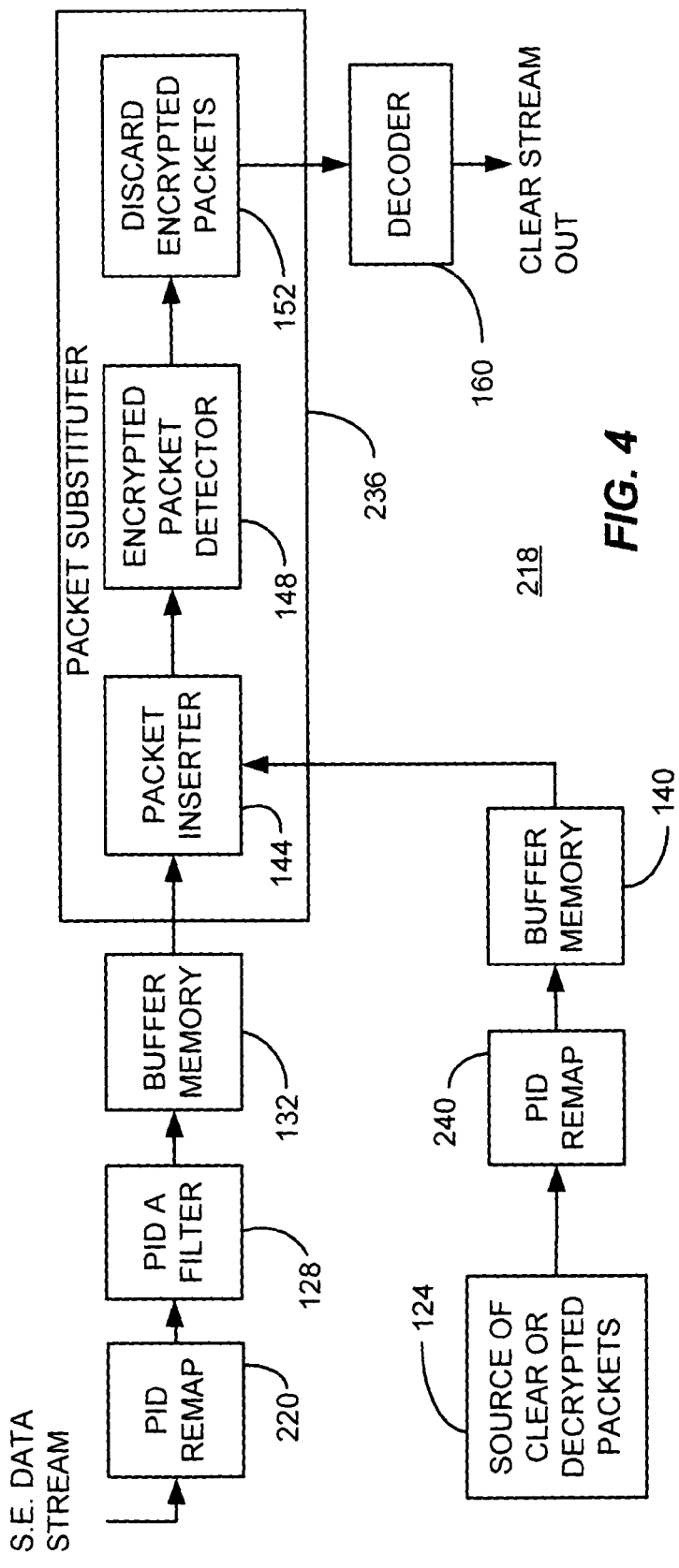
FIG. 4 is a block diagram of another embodiment of a decoding system consistent with certain embodiments of the present invention.

In this embodiment, the data stream may be processed using the circuit 218 of FIG. 4, the incoming selectively encrypted data stream can be processed by a PID re-mapping circuit 220 to convert the PID C packets to PID A (or equivalently, the PID A packets can be converted to PID B, both can be mapped to another PID, or other mappings can be used). In this example, the re-mapped stream from 220 is then passed to a PID filter 128 that in this case is configured to throw away packets except those having PID A. Thus, the PID B packets are discarded at PID filter 128.

The packets from PID filter 128 can be buffered at a buffer memory 132 and then provided to the packet substituter 236. The source of clear or decrypted packets 124 can provide packets to a PID re-mapper 240 that re-maps the PID of the clear packets to PID A. The PID re-mapper 240's output can be buffered by buffer 140 and then provided to the packet inserter 144 of packet substituter 236. Packet inserter 144 then inserts the clear PID A packets into the data stream so that all packets now have PID A and the only remaining task is to remove the encrypted packets as before at 148 and 152 (e.g., by PID filtering). In other embodiments, equivalently, the encrypted packets can remain in place if ignored by the decoder 160.

In another embodiment, the PID re-mapper 220 of FIG. 4 may be omitted as can the PID filter 128. In this example, clear packets from 124 may also not require remapping at 240. In order to effect the packet substitution, the clear packets from 124 are inserted into the data stream adjacent the encrypted packets and the encrypted packets can be removed using PID filtering if the encrypted packets have different PID values from the clear packets. If not, the encrypted flag can be used to identify and delete the encrypted packets. Other variations will occur to those skilled in the art. Preferably, at the output of the packet substituter, all PIDs wind up the same when provided to the decoder 160. However, this is not an absolute requirement if the decoder can deal with multiple PID values for a single elementary data stream.

It should be clear to those skilled in the art upon consideration of this teaching that the particular PID assignments used in a particular selectively encrypted data stream as well as the PID assignments for the clear data from 120 is not particularly important as long as they can be determined in a manner that permits the desired substitution, and in some instances, remapping to a single PID value for decoding. Thus, any suitable PID mapping can be used without departing from certain embodiments consistent with the present invention.

The various systems described above can be generically represented by the block diagram of circuit 320 of FIG. 5 in which a single or multiple selectively encrypted data stream is processed by a packet substituter 336 in which a source of clear packets 124 provides clear packets which are substituted for the encrypted packets in the input data stream. This produces a stream of clear packets that can be decoded by a suitable decoder 160. Thus, an apparatus for manipulating a selectively encrypted data stream in a manner consistent with certain embodiments has a filter that selects a set of packets from the selectively encrypted data stream based upon packet identifier values to produce a stream of packets having clear packets and encrypted packets. A packet substituter inserts a clear version of the encrypted packets into the stream of packets in place of the encrypted packets to produce a stream of clear data.

The above-referenced systems and processes use a source of clear packets that can be either supplied as a data stream or computer file, etc. from the original source of the content (or subsequent processor), or can be generated by decryption of selectively encrypted content. FIG. 6 depicts one exemplary system that can act as source 124 of the decrypted packets. In this system, the selectively encrypted data stream such as 100 is provided as an input. The system first identifies one of the two sets of encrypted packets to decrypt. In this case, this is easily accomplished using a PID B filter 350 to select the packets encrypted under the encryption process defined by conditional access system Y. (In other embodiments, packets could be selected by selecting encrypted packets with PID A.) These packets are then decrypted using CA decryption system 354 to produce a set of packets that are decrypted. This set of packets represents only one set of the encrypted packets, and thus is much smaller generally than the entire content represented by the selectively encrypted data stream. This set of packets can then be stored as a computer file on a computer readable storage medium 358 and/or transmitted using a transmitting device such as a broadband or narrowband modem 362 to a remote location where the decoding of the selectively encrypted data stream is to take place. In some cases, the storage medium can be, for example, an optical disk or a magnetic disk or semiconductor storage device. Such devices can then either be directly distributed to an end user or used as a source for later transmission, e.g., over the Internet.

Therefore, an apparatus for supplying decrypted packets for substitution in place of encrypted packets in a selectively encrypted data stream in a manner consistent with certain embodiments has an encrypted packet detector that detects a set of encrypted packets in the selectively encrypted data stream and discards packets in the data stream that are not encrypted. A decrypter decrypts the set of encrypted packets in the selectively encrypted data stream to produce a set of decrypted clear packets, wherein the decrypted clear packets can be substituted for the encrypted packets in the selectively encrypted data stream.

In another embodiment, a file or stream of data packets 368 as depicted in FIG. 7 can be utilized. In this embodiment, when the decrypter 354 of FIG. 6 decrypts the encrypted packets, they are stored along with the encrypted packets at a position adjacent one or more of the encrypted packets. In this example, the packets 108 with PID A encrypted under CA system X are followed by a packet 112 containing identical data except encrypted under CA system Y and having PID B. These packets are then followed by a clear packet 370 containing the decrypted version of the packet's payload, which may have any selected PID (shown as PID F). This arrangement can be modified in the order of presentation of the packets or can only, for example contain one of the encrypted versions of the packets. (either 108 or 112) in other exemplary embodiments. This file or data stream can then be sent to the decoding device. In this embodiment, the selectively encrypted data stream can be easily modified by matching one or both of packets 108 and 112 to the packets in the original data stream. The placement of the clear packets 370 (in this case, immediately following the encrypted packets) identifies the packets that can be substituted for the encrypted packets.

Any of the above decoding techniques can be implemented in a television STB that has had software modifications to facilitate the operation as described. Also, the above techniques can be implemented in any suitable video player device including, but not limited to, a personal computing device or television receiver.

The basic decoding processes just described can be carried out by the process 400 shown in FIG. 8 starting at 402. At 406 a selectively encrypted data stream is received and a set of clear packets is received at 410. The clear packets can be received and stored prior to receipt of the selectively encrypted data stream, or the process can occur substantially simultaneously. At 414, the clear packets are substituted for the encrypted packets in the selectively encrypted data stream to produce a clear data stream. This clear data stream can then be decoded and played at 418. The process ends at 422 after the last substitution and decoding has taken place.

Thus, a method of decoding a selectively encrypted data stream consistent with certain embodiments involves receiving the selectively encrypted data stream from a first source; receiving a set of clear packets from a second source, the set of clear packets containing data representing an unencrypted version of the encrypted packets present in the selectively data stream; detecting a plurality of encrypted packets forming a part of the selectively encrypted data stream; and substituting the clear packets for the encrypted packets to form a clear data stream.

One process described above for creation of the file or data stream containing the clear data stream is depicted as process 430 of FIG. 9 starting at 434. A file or data stream of the selectively encrypted content is received at 438 and is decrypted using an appropriate decrypter to produce a set of clear packets corresponding to the encrypted packets originally appearing in the selectively encrypted content at 442. This set of clear packets is then stored and/or transmitted to another decoding device at 446 and the process ends at 450.

Thus, a method of generating a set of clear packets consistent with certain embodiments involves receiving a selectively encrypted stream of data; detecting encrypted packets within the selectively encrypted stream of data; creating a set of clear packets by decrypting the encrypted packets detected within the selectively encrypted stream of data. Additionally, a method of facilitating decoding of a selectively encrypted data stream involves creating a set of clear packets corresponding to a set of encrypted packets present in the selectively encrypted data stream; and providing the set of clear packets to a decoder for substitution in place of the set of encrypted packets present in the selectively encrypted data stream.

The decoding mechanism previously described can be realized in many ways to decode programming from, for example, a cable television or satellite television network. By way of example, and not limitation, FIGS. 10-12 depict several overall systems in which certain embodiments of the present invention can be utilized to decode selectively encrypted content. In FIG. 10, a cable television system headend 504 transmits content that is selectively encrypted through cable network 508 to a television Set-Top Box 512 for decoding. In order to decode the content, a source of clear packets 124 corresponding to a set of the selectively encrypted packets transmits the clear packets via, for example, the Internet 516 or electronic mail to the STB 512's internal modem. The STB 512 software then implements a decoding process such as one of the exemplary processes previously described.

A similar process can be used to decode the selectively encrypted content in the system depicted in FIG. 11, except that in this exemplary embodiment, the clear packets are received, e.g., by virtue of a subscription service, in the form of a computer readable storage medium such as a Compact Disc (CD) or Digital Versatile Disc (DVD) 520. In other embodiments, the clear packets could equally well be supplied in the form of semiconductor storage devices or any other suitable computer readable storage medium. The storage medium is played in a suitable player 524 in order to access the clear packets. The clear packets are thus supplied to STB 512 which operates in a manner similar to that previously described except that the source of clera packets is different.

A similar process can be used to decode the selectively encrypted content in the system depicted in FIG. 12, except that in this exemplary embodiment, the clear packets are received, e.g., by virtue of a subscription service, by any suitable mechanism and stored on a hard disc drive or similar device 530. The clear packets can be received in any manner and retrieved as needed from the disc drive 530. The clear packets are thus supplied to STB 512 which operates in a manner similar to that previously described except that the source of clear packets is different.

Thus, a data signal for use in decoding a selectively encrypted data stream, can have a collection of unencrypted data packets corresponding to a set of encrypted data packets, the encrypted data packets forming one set of selectively encrypted packets that represent an encrypted part of the selectively encrypted data stream. Another data signal can have a selectively encrypted data stream in which a set of encrypted packets have been removed and replaced by a set of decrypted packets, wherein the decrypted packets are obtained from a separate source. Either of these data signals can be transmitted or stored in a computer readable storage medium.

Figure 13:
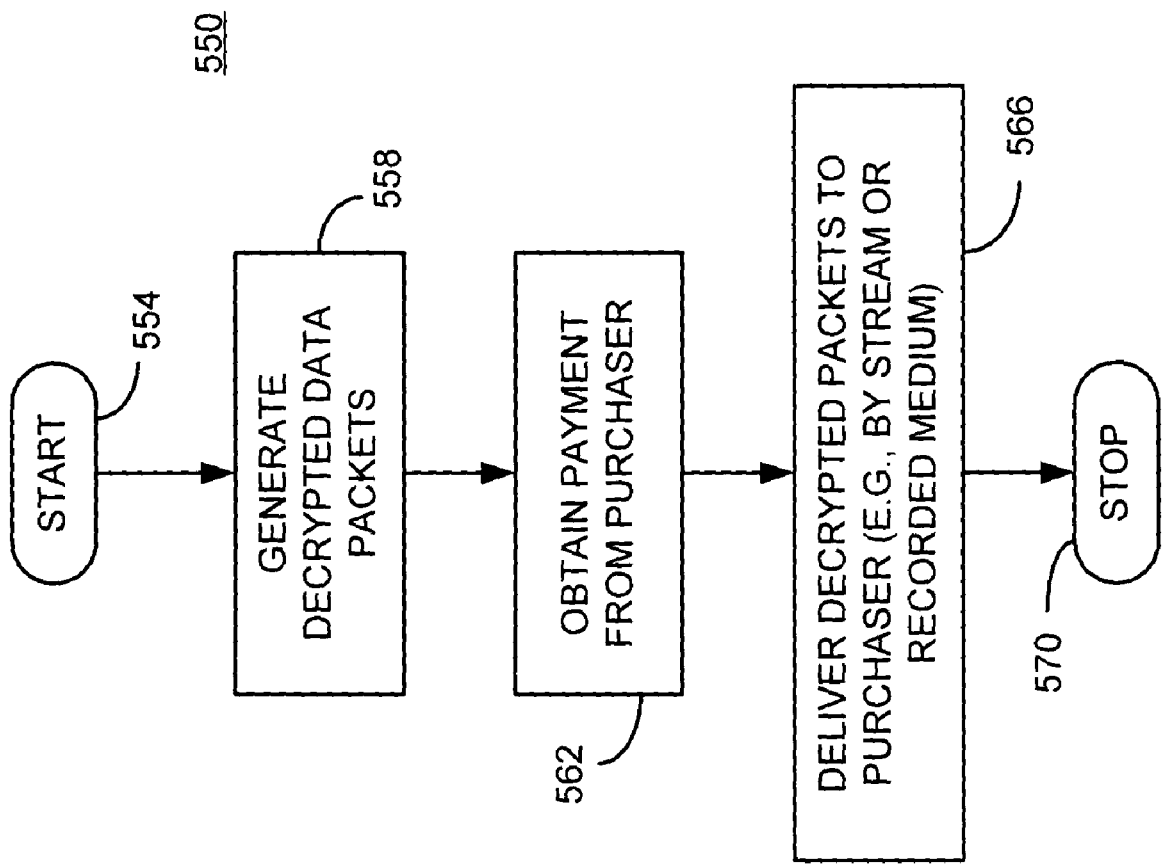
FIG. 13 is a flow chart of a method for providing clear packet data in a manner consistent with certain embodiments of the present invention.

A subscription service can operate according to a method for decoding selectively encrypted content in a manner consistent with process 550 of FIG. 13 starting at 554 which involves generating a set of decrypted data packets at 558 corresponding to a set of encrypted data packets appearing in the selectively encrypted content by decryption of the set of encrypted data packets; obtaining a fee from a purchaser at 562; and delivering the set of unencrypted data packets to the purchaser at 566. The process then stops at 570.

While the above descriptions presume that a television STB is used as the playback device for a cable or satellite broadcast, this should not be considered limiting. The playback device could equally well be equivalently built into a television receiver of any sort or may form a part of a personal computing device without limitation. Moreover, although the preferred embodiment utilizes a cable television or satellite television system as the source of selectively encrypted content, other sources such as packaged media could equivalently be decoded in this manner.

The source of clear packets can provide such clear packets as a subscription service wherein the subscriber purchases, leases or otherwise obtains a STB or personal computing device with appropriate software or installs suitable programming on a commercially available STB or other playback device. In exchange for subscription fees, the user can then obtain copies of the clear packets from the source of clear packets 124 by email or download to the STB 512, and can subsequently decode the encrypted programming.

Those skilled in the art will recognize upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors which are equivalents. Similarly, general purpose computers, microprocessor based computers, micro-controllers, optical computers, analog computers, dedicated processors, application specific circuits and/or dedicated hard wired logic may be used to construct alternative equivalent embodiments.

Those skilled in the art will appreciate, upon consideration of the above teachings, that the program operations and processes and associated clear packet data used to implement certain of the embodiments described above can be implemented using streaming data as well as disc storage and other forms of computer readable storage such as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. Such alternative storage devices should be considered equivalents.

While the embodiments above are illustrated using a dual selectively encrypted data stream, single or multiple encrypted data streams can equally well be decoded in the manner taught.

Certain embodiments described herein, are or may be implemented using a programmed processor executing programming instructions that are broadly described above in flow chart form that can be stored on any suitable electronic or computer readable storage medium and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments of the invention have been described, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method of decoding a selectively encrypted data stream at a digital television receiver device, comprising:
at the digital television receiver device, receiving the selectively encrypted data stream from a first source;
at the digital television receiver device, receiving a set of clear packets from a second source, the set of clear packets containing data representing an unencrypted version of the encrypted packets present in the selectively encrypted data stream;
detecting a plurality of encrypted packets forming a part of the selectively encrypted data stream;
substituting the clear packets from the second source for the encrypted packets to form a clear data stream, such clear data stream thereby being produced without decryption of the encrypted packets present in the selectively encrypted data stream by the digital television receiver device;
filtering a set of packets from the selectively encrypted data stream based upon packet identifier values to produce a stream of packets having clear packets and encrypted packets; and
substituting the clear packets from the second source for the encrypted packets into the stream of packets in place of the encrypted packets to produce a stream of clear data.

2. The method according to claim 1, wherein the detecting is carried out by detecting a packet identifier.

3. The method according to claim 1, wherein the detecting is carried out by detecting an encryption flag.

4. The method according to claim 1, further comprising deleting encrypted packets from the selectively encrypted data stream.

5. The apparatus according to claim 1, further comprising decoding the clear data stream.

6. The method according to claim 1, wherein the second source comprises a computer file.

7. The method according to claim 1, wherein the second source comprises a stream of data received over a communication medium.

8. A computer readable storage medium, storing instructions that when executed on a programmed processor carry out a method of decoding a selectively encrypted data stream at a digital television receiver device, comprising:
at the digital television receiver device, receiving the selectively encrypted data stream from a first source;
at the digital television receiver device, receiving a set of clear packets from a second source, the set of clear packets containing data representing an unencrypted version of the encrypted packets present in the selectively encrypted data stream;
detecting a plurality of encrypted packets forming a part of the selectively encrypted data stream;
substituting the clear packets from the second source for the encrypted packets to form a clear data stream, such clear data stream thereby being produced without decryption of the encrypted packets present in the selectively encrypted data stream by the digital television receiver device;

filtering a set of packets from the selectively encrypted data stream based upon packet identifier values to produce a stream of packets having clear packets and encrypted packets; and substituting the clear packets from the second source for the encrypted packets into the stream of packets in place of the encrypted packets to produce a stream of clear data.

9. An apparatus for manipulating a selectively encrypted data stream at a digital television receiver device, comprising:

a receiver that receives the selectively encrypted data stream from a first source of content;

a filter that selects a set of packets from the selectively encrypted data stream received at the digital television receiver device based upon packet identifier values to produce a stream of packets having clear packets and encrypted packets;

means for receiving a set of clear packets from a second source, the clear packets comprising unencrypted packets corresponding to the encrypted packets of the selectively encrypted data stream;

a packet substitutor that inserts the clear packets into the stream of packets in place of the encrypted packets to produce a stream of clear data without decrypting the encrypted packets at the digital television receiver device;

wherein the packet substitutor comprises an encrypted packet detector that detects encrypted packets in the selectively encrypted data stream; and a packet inserter that inserts the clear version of the encrypted packets into the stream of packets.

10. The apparatus according to claim 9, wherein the packet substituter further comprises:

an encrypted packet deleter that deletes the encrypted packets from the stream of packets to produce the stream of clear data.

11. The apparatus according to claim 10, wherein the encrypted packet detector detects encrypted packets by an encryption flag.

12. The apparatus according to claim 10, wherein the encrypted packet detector detects the encrypted packets by location in the data stream.

13. The apparatus according to claim 10, wherein the encrypted packet detector detects the encrypted packets by packet identifier.

14. The apparatus according to claim 9, wherein the packet substituter determines which encrypted packets are to be substituted by detecting encrypted packets by an encryption flag.

15. The apparatus according to claim 9, wherein the packet substituter determines which encrypted packets are to be substituted by detecting the encrypted packets by location in the data stream.

16. The apparatus according to claim 10, wherein the packet substituter determines which encrypted packets are to be substituted by detecting the encrypted packets by packet identifier.

17. The apparatus according to claim 9, further comprising a decoder that decodes the stream of clear packets in the data stream.

\* \* \* \* \*